(12) United States Patent
Baldoni et al.

(10) Patent No.: US 8,764,924 B2
(45) Date of Patent: Jul. 1, 2014

(54) TIRE CARCASS BUILDING METHOD AND DRUM

(75) Inventors: Viscardo Baldoni, Rovereto (IT); Flavio Boscolo, Trambileno Frazione Porte (IT)

(73) Assignee: Marangoni Meccanica S.p.A., Roverto (IT)

( * ) Notice: Subject to any disclaimer, the term of this patent is extended or adjusted under 35 U.S.C. 154(b) by 51 days.

(21) Appl. No.: 13/256,100

(22) PCT Filed: Mar. 12, 2010

(86) PCT No.: PCT/IB2010/000527
§ 371 (c)(1),
(2), (4) Date: Dec. 21, 2011

(87) PCT Pub. No.: WO2010/103393
PCT Pub. Date: Sep. 16, 2010

(65) Prior Publication Data
US 2012/0111480 A1      May 10, 2012

(30) Foreign Application Priority Data
Mar. 13, 2009   (IT) .............................. TO2009A0191

(51) Int. Cl.
*B29D 30/24*   (2006.01)
*B29D 30/32*   (2006.01)

(52) U.S. Cl.
USPC ............ 156/132; 156/131; 156/135; 156/415

(58) Field of Classification Search
USPC ......... 156/131, 132, 133, 135, 398, 400–402, 156/414, 415, 417, 420, 421.4, 421.8
See application file for complete search history.

(56) References Cited

U.S. PATENT DOCUMENTS

| | | | |
|---|---|---|---|
| 3,414,446 A | | 12/1968 | Pearce et al. |
| 3,562,062 A | * | 2/1971 | Bryant .......................... 156/401 |
| 3,645,818 A | * | 2/1972 | Frazier ....................... 156/128.1 |
| 3,684,621 A | | 8/1972 | Frazier et al. |
| 3,767,509 A | * | 10/1973 | Gazuit .......................... 156/415 |
| 3,833,445 A | | 9/1974 | Mallory et al. |
| 4,149,927 A | | 4/1979 | Lauer, Jr. |
| 4,290,472 A | * | 9/1981 | Bryant .......................... 156/416 |
| 2008/0264570 A1 | | 10/2008 | Slots et al. |

FOREIGN PATENT DOCUMENTS

| | | |
|---|---|---|
| EP | 0459728 A | 12/1991 |
| EP | 0468580 A | 1/1992 |
| WO | WO 2008/122852 A | 10/2008 |

* cited by examiner

*Primary Examiner* — Geoffrey L Knable
(74) *Attorney, Agent, or Firm* — Frommer Lawrence & Haug LLP; Ronald R. Santucci

(57) ABSTRACT

To build a tire carcass, a tubular carcass body is formed about a building drum, which has a longitudinal axis, and an outer surface coaxial with the longitudinal axis and defined at least partly by a ring of longitudinal articulated rods lying in respective planes of a sheaf of planes through the longitudinal axis; the building drum locking two bead bundles to the tubular carcass body and torus-shaping the tubular carcass body by moving and/or deforming the articulated rods in their planes.

7 Claims, 5 Drawing Sheets

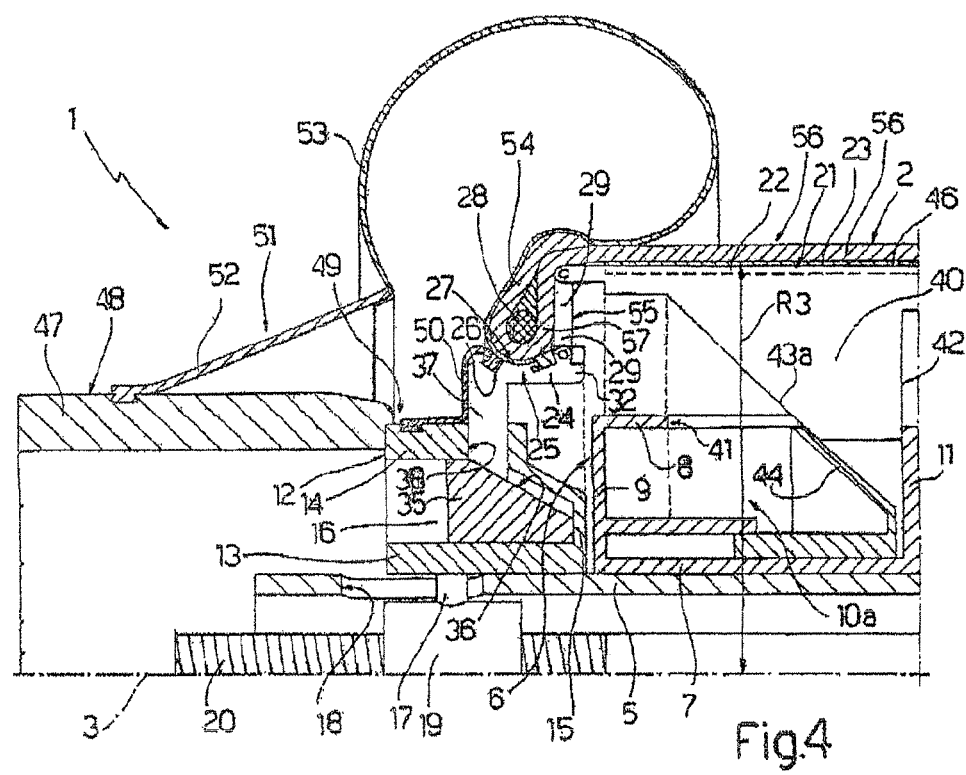
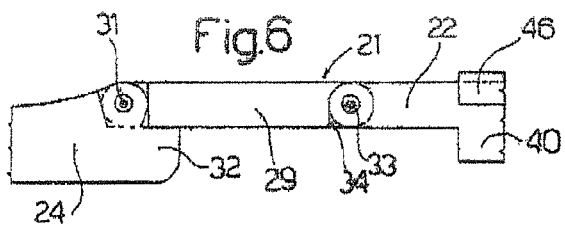
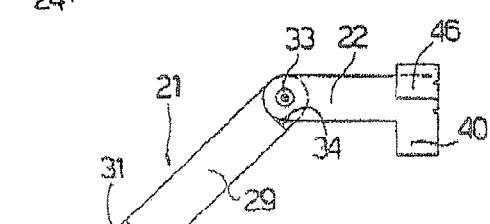
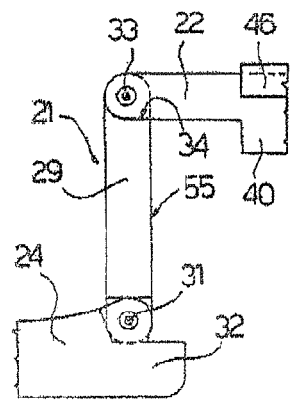
Fig.4
Fig.6
Fig.7
Fig.8

TIRE CARCASS BUILDING METHOD AND DRUM

This application is a 371 of PCT/IB2010/000527 filed on Mar. 12, 2010, published on Sep. 16, 2010 under publication number WO 2010/103393 A and which claims priority benefits to Italian Patent Application No. TO2009 A 000191 filed Mar. 13, 2009, the entire disclosure of which is incorporated herein by reference.

TECHNICAL FIELD

The present invention relates to a tyre carcass Building method and drum.

BACKGROUND ART

Tyre carcasses are normally made on a first-stage building drum, which comprises two coaxial half-drums movable in opposite directions along a common longitudinal axis by an actuating device.

Each half-drum comprises an expandible bead carrier normally defined by a ring of sectors, which are movable, substantially radially with respect to the common longitudinal axis and by a normally pneumatic actuating device, to and from an expanded position clamping a respective bead bundle in a given axial position along the half-drum and radially outwards of a carcass body laid flat on the building drum.

Each half-drum also comprises at least one turn-up device normally defined by a bladder which, when idle, rests flat on the half-drum, axially outwards of the bead carrier, and is inflatable to turn an annular lateral portion of the carcass body up and outwards about the bead bundle.

This turn-up operation is normally performed either with the central portion of the carcass body between the bead bundles still flat (in which case, the half-drums are not needed), or after torus-shaping the central portion by moving the two half-drums towards each other, and feeding compressed air into the torus directly and/or with the interposition of bladders, which are inflated inside the torus to somehow counterbalance the outer axial thrust of the turn-up bladders.

In the first case, the turn-up operation involves turning over the longitudinal lateral portions of the carcass body 180°, thus inevitably exerting harmful twisting moments on the bead bundles.

In the second case, the turn-up operation is limited to a roughly 90-100° turn-up with substantially no twisting moments, but calls for a much more complicated drum featuring inner bladders and/or seals to inflate the central portion of the carcass body and form an annular shoulder axially inwards of each bead bundle.

In connection with the above, it should be pointed out that the carcass body in question is still green, and therefore unable to safely withstand the internal pressures needed to counterbalance the thrust of the turn-up bladders and ensure firm adhesion of the turned-up longitudinal lateral portions to the central portion of the carcass body.

To avoid having to feed compressed air into the carcass body to form the annular shoulders, building drums have been proposed—for example, in U.S. Pat. Nos. 3,414,446, 3,684, 621, US-2008/264570, EP-0459728, U.S. Pat. No. 3,833, 445, EP-0468580 and U.S. Pat. No. 4,149,927—featuring various types of deformable cages located between the bead carriers, and which expand radially outwards to support the central portion of the carcass mechanically from the inside and counterbalance the thrust of the turn-up bladders.

Though solving the problem of forming the annular shoulders and mechanically counterbalancing the thrust of the turn-up bladders, deformable cages of the type described seriously complicate the central part of the drum, which is normally quite simple in design, while the end portions of the drum, which are normally complicated in design, remain unchanged. In other words, known drums of the above type are so complex as to be unreliable.

Moreover, when expanded, the cages of known drums of the type described give rise to two separate structures or one axially weak structure. In other words, drums of this sort do not guarantee axially symmetrical tyres, and cannot be used anyway for producing relatively large tyres.

Disclosure of Invention

It is an object of the present invention to provide a tyre carcass building method designed to eliminate the above drawbacks.

According to the present invention, there is provided a tyre carcass building method as claimed in Claim 1 and preferably in any one of the following Claims depending directly or indirectly on Claim 1.

According to the present invention, there is also provided a tyre carcass building drum as claimed in Claim 9 and preferably in any one of the following Claims depending directly or indirectly on Claim 9.

BRIEF DESCRIPTION OF THE DRAWINGS

A number of non-limiting embodiments of the invention will be described by way of example with reference to the accompanying drawings, in which:

FIGS. 2 to 4 show larger-scale, axial sections of a detail in FIG. 1 in other respective operating configurations;

FIGS. 6 to 8 show larger-scale views of a first detail in FIG. 1 in respective different operating configurations;

BEST MODE FOR CARRYING OUT THE INVENTION

Figure 1:
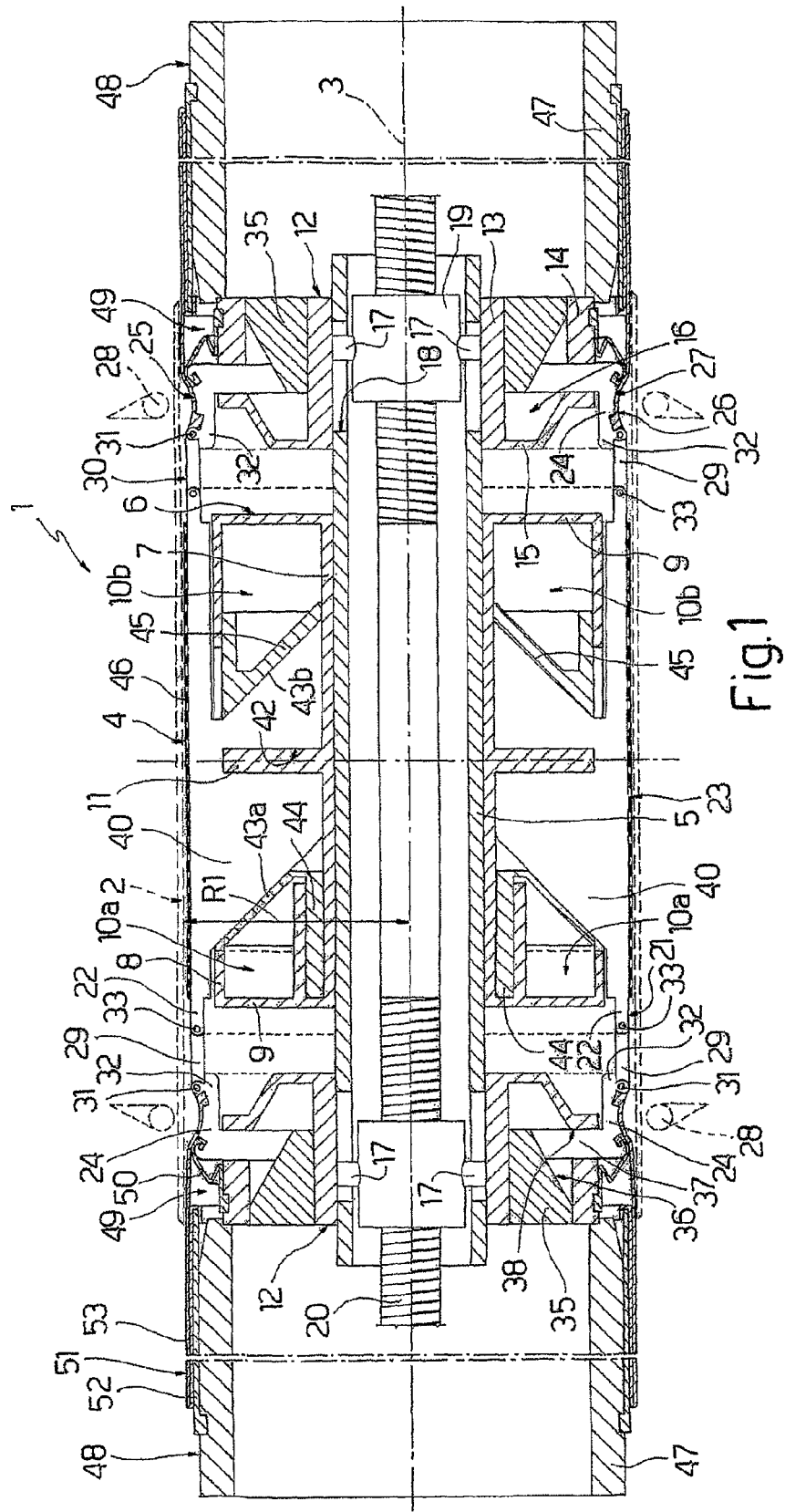
FIG. 1 shows an axial section of a preferred embodiment of the building drum according to the present invention in a first operating configuration.

Number 1 in FIGS. 1 to 4 indicates as a whole a first-stage building drum for forming a carcass 2 of a tyre (not shown). Drum 1 has a longitudinal axis 3, and comprises a substantially cylindrical outer surface coaxial with axis 3 and indicated as a whole by 4; and a tubular central shaft 5 coaxial with axis 3 and mounted on known supports (not shown) to rotate about axis 3 under the control of known actuating means (not shown).

Drum 1 also comprises a box body 6 fixed to a central portion of shaft 5 and in turn comprising an inner sleeve 7 fixed to shaft 5; an outer tubular body 8 coaxial with axis 3 and sleeve 7; and two annular end walls 9 perpendicular to axis 3, and which connect respective corresponding ends of sleeve 7 and tubular body 8 to form, with sleeve 7 and tubular body 8, a cylindrical annular chamber divided axially into two half-chambers 10*a* and 10*b* (FIG. 1) by a central annular partition 11 parallel to annular walls 9.

Drum 1 also comprises two half-drums 12 (only one shown in FIGS. 2 to 5) coaxial with axis 3, connected in axially-sliding manner to shaft 5, and located on opposite sides of box body 6.

As shown more clearly in FIGS. 2 to 5, each half-drum 12 comprises an inner sleeve 13 fitted in axially-sliding manner to shaft 5; an outer tubular body 14 coaxial with axis 3 and sleeve 13, and of substantially the same outside diameter as tubular body 8; and an annular end wall 15, which connects the ends of sleeve 13 and tubular body 14 facing box body 6, to form, with sleeve 13 and tubular body 14, an annular chamber 16. Inside, sleeve 13 has a number of radial appendixes 17 (in the FIG. 1 example, radial appendixes 17 are two in number, but may number one or more than two), each of which engages and slides transversely inside a respective axial slot 18 through shaft 5, to support, inside shaft 5, an internally threaded hub 19 engaged by a respective threaded portion of a central screw 20, which is coaxial with axis 3, is supported in rotary and axially-fixed manner by known supporting means (not shown), and is connected to known actuating means to rotate about axis 3. Hubs 19 are oppositely threaded, as are the respective threaded portions of screw 20, so that rotation of screw 20 in one direction corresponds, in known manner, to opposite axial movements of the two half-drums along shaft 5.

The outer surface 4 of drum 1 is defined by a ring of articulated longitudinal rods, each indicated as a whole by 21, equally spaced about axis 3 and lying in respective planes of a sheaf of planes through axis 3.

Figure 2:
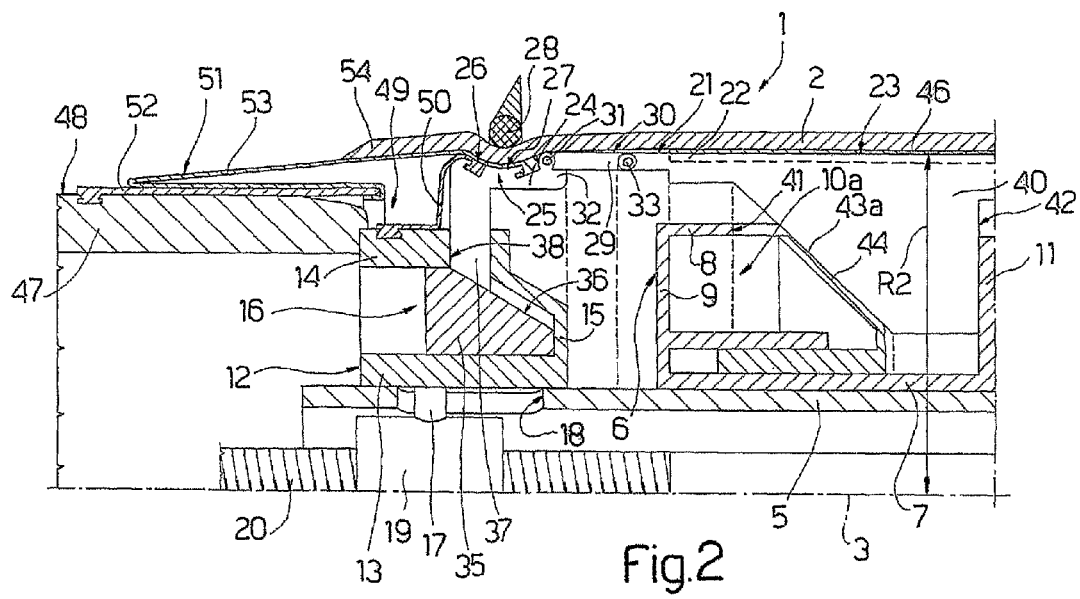
Figure 3:
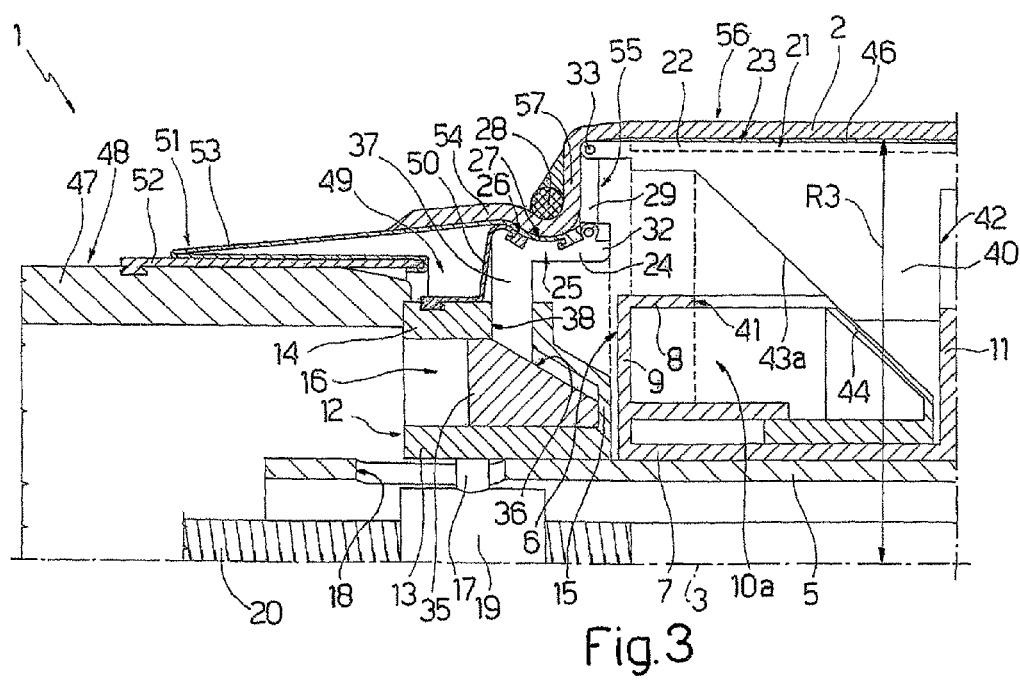
Figure 5:
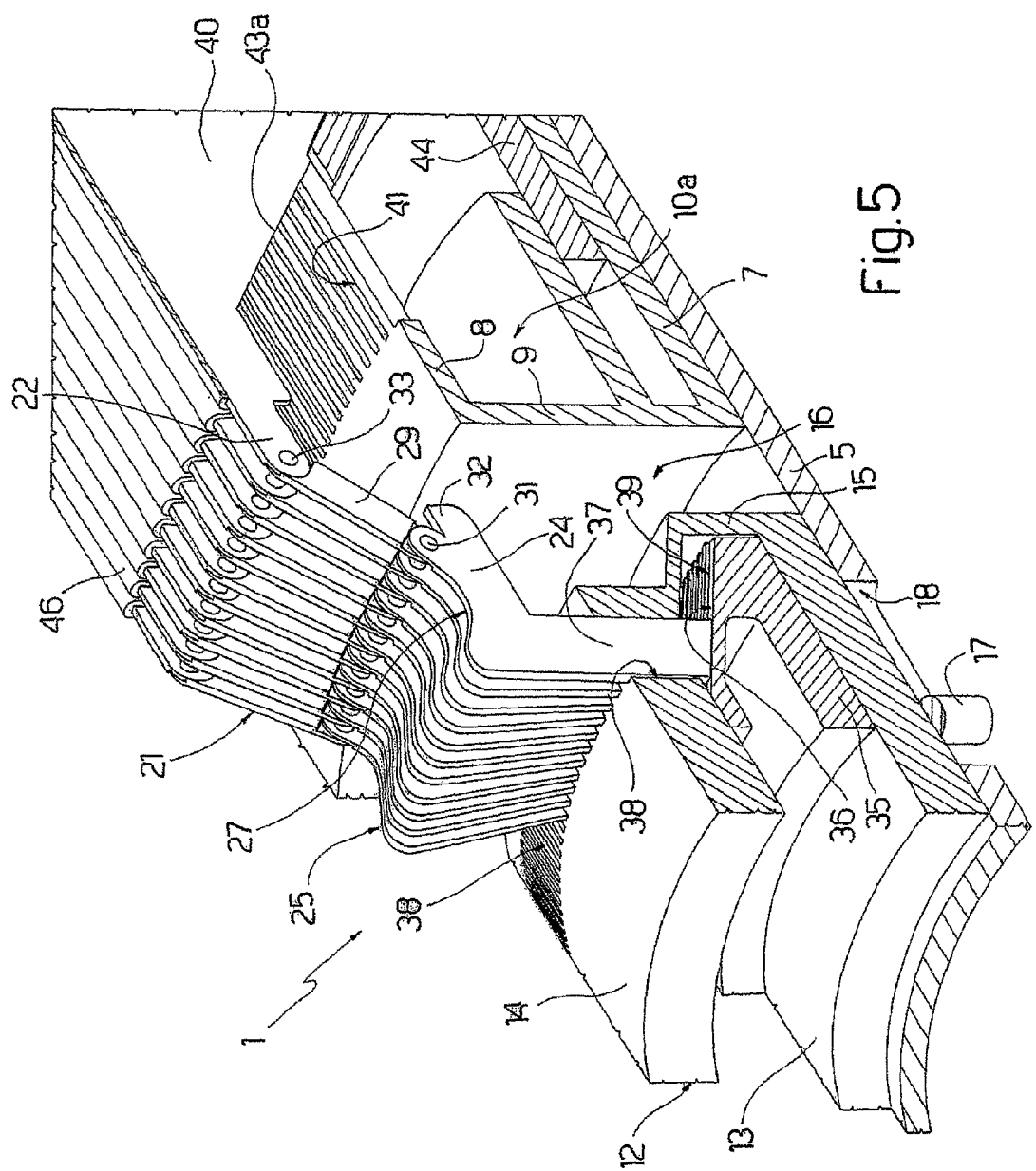
FIG. 5 shows a view in perspective, with parts removed for clarity, of the FIG. 2-4 detail.

As shown more clearly in FIGS. 2 to 4, each articulated rod 21 comprises a central portion 22 located radially outwards of tubular body 8 of box body 6, and which is parallel to axis 3, projects axially at each end outwards of box body 6, and defines, together with the central portions 22 of the other articulated rods 21, a cylindrical central portion 23 of outer surface 4. Each articulated rod 21 also comprises two end portions 24, each of which is located radially outwards of outer tubular body 14 of relative half-drum 12, projects axially at one end outwards of relative half-drum 12 and towards box body 6, and defines, with the corresponding end portions 24 of the other articulated rods 21, an annular bead carrier 25, the outer surface of which defines an end portion 26 of outer surface 4, and has an annular saddle 27 coaxial with axis 3 and for receiving and clamping in position a relative bead bundle 28 of carcass 2.

Each articulated rod 21 also comprises two intermediate portions, each defined by a connecting rod 29 for hinging relative end portion 24 to a relative end of central portion 22. Each connecting rod 29 defines, together with the corresponding connecting rods 29 of the other articulated rods 21, a relative intermediate portion 30 of outer surface 4.

As shown more clearly in FIGS. 6 to 8, each connecting rod 29 has an axially outer end connected to an intermediate point of relative end portion 24 of relative articulated rod 21 by a hinge 31, which has an axis perpendicular to the plane of relative articulated rod 21, and defines, on relative end portion 24, a tooth projecting from hinge 31 towards box body 6, and which cooperates (FIG. 6) with an inner edge of relative connecting rod 29 to prevent connecting rod 29, as it oscillates towards shaft 5 about the axis of hinge 31, from exceeding an extended horizontal position. Each connecting rod 29 also has an axially inner end, which is connected to a relative end of central portion 22 of relative articulated rod 21 by a hinge 33 with an axis perpendicular to the plane of relative articulated rod 21, and has a recess housing the relative end of central portion 22 and having an edge 34 perpendicular to connecting rod 29 and which cooperates with an inner edge of central portion 22 to prevent connecting rod 29, as it oscillates towards shaft 5 about the axis of hinge 33, from exceeding a raised vertical position.

In other words, oscillation of the two connecting rods 29 of each articulated rod 21 is limited by respective teeth 32 and edges 34 to an angle of roughly 90° between the extended horizontal position, in which the two connecting rods 29 are coaxial with each other and with the rest of relative articulated rod 21, and the raised vertical position, in which the two connecting rods 29 are parallel to each other and perpendicular to axis 3 and the rest of relative articulated rod 21.

With reference to FIGS. 2 to 4, annular chamber of each half-drum 12 houses in sliding manner an annular piston 35, the surface 36 of which, facing box body 6, is truncated-cone-shaped with its vertex facing box body 6 and its axis coincident with axis 3. Surface 36 cooperates with a number of follower rods 37, each of which extends towards axis 3 from a respective end portion 24, is coplanar with relative articulated rod 21, extends and slides through a respective slot 38 formed through outer tubular body 14 of relative half-drum 12, and has, on its inner end, a shoe, which engages in sliding manner a respective groove 39 (FIG. 5) extending along a generatrix of surface 36 and coplanar with relative articulated rod 21.

In other words, each slot 38 cooperates with corresponding groove 39 to guide relative follower rod 37 in the plane of relative articulated rod 21, and keep follower rod 37 in a radial position with respect to axis 3 at all times. As a result, movement of pistons 35, by known actuating means not shown, towards each other from the FIG. 1 position causes end portions 24 to translate radially outwards, thus expanding bead carriers 25 and, in use, clamping bead bundles 28 in position (FIGS. 2 to 4).

Central portion 22 of each articulated rod 21 has a respective follower plate 40, which is coplanar with relative articulated rod 21, penetrates inside box body through a respective slot 41 formed through outer tubular body 8 of box body 6 and parallel to axis 3, is divided into two parts by a central slot 42 engaged in sliding manner by central partition 11, and is in the form of a trapezium bounded laterally by two parallel sloping edges 43a, 43b (FIG. 1). Edge 43a extends inside half-chamber 10a, and engages a respective groove (not shown and similar to groove 39) formed along a generatrix of a truncated-cone-shaped annular piston 44 coaxial with axis 3 and mounted to slide along half-chamber 10a; and edge 43b extends inside half-chamber 10b, and engages a respective groove (not shown and similar to groove 39) formed along a generatrix of a truncated-cone-shaped annular piston 45 (FIG. 1) coaxial with axis 3 and mounted to slide along half-chamber 10b.

In other words, each slot 41 cooperates with the corresponding grooves (not shown) in pistons 44 and 45 to guide relative follower plate 40 in the plane of relative articulated rod 21, and keep follower plate 40 in a radial position with respect to axis 3 at all times. As a result, movement of pistons 44 and 45, by known actuating means not shown, in the same direction and rightwards in FIG. 1 causes central portions 22 to move outwards, thus expanding central portion 23 of outer surface 4. In this connection, it should be pointed out that the above movement is purely translatory, due to engagement of follower plates 40 by central partition 11 preventing any axial movement of central portions 22.

To make central portion 23 of outer surface 4 continuous, regardless of its radius, central portions 22 of articulated rods 21 as a whole are covered with an elastic sleeve 46.

As shown in FIG. 1, each half-drum 12 is complete with a tubular appendix 47 coaxial with axis 3 and fitted to the axially outer end of relative outer tubular body 14. Tubular appendix 47 has a cylindrical outer surface 48 of substantially the same diameter as outer surface 4 when articulated rods 21 are in the extended FIG. 1 configuration, and therefore larger in diameter than the outside diameter of relative outer tubular body 14, and defines, with relative bead carrier 25, an annular groove 49 about relative outer tubular body 14.

As shown in FIGS. 1 to 3, each half-drum 12 is fitted with an annular sealing bladder 50, and an annular turn-up bladder 51.

More specifically, bladder 50 has a first annular shoe inserted inside a groove formed in relative bead carrier 25, close to an axially outer end of saddle 27; and a second annular shoe inserted inside a groove formed in relative outer tubular body 14, close to an axially outer end of outer tubular body 14 and inside relative annular groove 49. When articulated rods 21 are in the extended FIG. 1 position, bladder 50 is folded inside relative groove 49.

Bladder 51 is a controlled differential expansion bladder, and has an annular inner shoe inserted inside a groove formed in relative bead carrier 25, close to an axially inner end of saddle 27; and an annular outer shoe inserted inside a groove formed in relative tubular appendix 47, close to an axially outer end of outer surface 48. In other words, bladder 51 is located radially outwards of relative bladder 50, and, when idle (FIG. 1), rests flat on the surface of relative saddle 27 and on outer surface 48 of relative tubular appendix 47.

Bladder 51 is known from the Applicant's Patent Application WO 2008/122852—published on 16 Oct. 2008, and included herein by way of reference in the interest of full disclosure—and is therefore not described in detail. More specifically, the embodiment shown in the attached drawings substantially corresponds to the embodiment described with reference to FIGS. 1 to 5 in Patent Application WO 2008/122852, and comprises a relatively rigid outer portion 52, which is connected to the outer shoe, deforms into a cone shape from the outer shoe, and, when idle, rests flat on outer surface 48 of the relative appendix; and a relatively elastic inner portion 53 interposed between portion 52 and the inner shoe, and folded onto portion 52 when idle.

The way in which bladder 51 deforms, when inflated with compressed air injected in known manner not shown, is described in detail in Patent Application WO 2008/122852.

Operation of drum 1 will now be described with reference to FIGS. 1 to 4.

As regards articulated rods 21 in the following description:
the term "extended configuration" is intended to mean a substantially straight configuration, in which central portion 22, end portions 24, and connecting rods 29 of each articulated rod 21 are substantially aligned with one another along a straight line parallel to axis 3;
the term "initial extended configuration" is intended to mean a configuration (FIG. 1), in which central portion 22, end portions 24, and connecting rods of each articulated rod 21 are aligned with one another along a straight line parallel to and at a minimum distance from axis 3, so that drum 1 has a minimum outer radius R1 substantially equal, at sleeve 46, to the outer radius of tubular appendixes 47;
the term "expanded extended configuration" is intended to mean a configuration of articulated rods 21 (FIG. 2), in which central portion 22, end portions 24, and connecting rods 29 of each articulated rod 21 are aligned with one another along a straight line parallel to and at such a distance from axis 3, that drum 1 has an outer radius R2 greater than R1; and the term "final expanded configuration" is intended to mean a configuration of articulated rods 21 (FIGS. 3 and 4), in which each articulated rod 21 is bent substantially omega-shaped, so that drum 1, at sleeve 46, has an outer radius R3 greater than R2.

To begin with, drum 1 is set to the initial configuration shown in FIG. 1, in which half-drums 12 are withdrawn the maximum distance apart and the maximum distance from box body 6, to keep articulated rods 21 in the extended position, and pistons 35 are in the withdrawn position to keep articulated rods 21 in the initial extended configuration.

Drum 1, still in this initial configuration, in which its outer surface is cylindrical with a substantially constant radius along its whole length, is rotated about axis 3, and, at the same time, successive tubular layers are placed on the outer surface of drum 1 to form the body of a substantially cylindrical tubular carcass 2, the outside diameter of which is smaller than the inside diameter of bead bundles 28. The body of cylindrical tubular carcass 2 is formed on drum 1 so that two annular lateral portions 54 of the carcass project axially outwards of respective saddles 27 and rest on respective bladders 51. Carcass 2 is then completed, as regards its component parts, by assembling bead bundles 28, each of which is moved axially into position over respective saddle 27.

At this point (FIG. 2), without moving half-drums 12, pistons 35 are activated to move from the withdrawn to a forward position substantially contacting relative annular end walls 15; and, at the same time, pistons 44 and 45 are moved (rightwards in FIG. 2) into an intermediate position. To be more precise, only piston is activated, and piston 45 passively imitates the movement of piston 44.

As a result of these movements, articulated rods 21 are translated in their respective planes, by follower rods 37 and follower plates 40, into the expanded extended configuration, and drum 1 performs a so-called bead-locking operation, i.e. to lock bead bundles 28 to the body of carcass 2. In the case of drum 1, this operation is performed not simply by expanding bead carriers 25, but by also equally expanding all the parts of drum 1 and the body of carcass 2 between bead carriers 25.

In the case of drum 1, this operation also involves extending bladders 50 substantially onto the axially outer surfaces of relative follower rods 37.

At this point (FIG. 3), with pistons 35 stationary in the forward position, pistons 44 and 45 are moved further (rightwards in FIG. 3) into a final position, and central screw 20 is activated at the same time to move half-drums 12 towards each other into a forward position substantially contacting box body 6.

As a result of these movements, central portion 22 of each articulated rod 21 is translated further outwards in its plane by relative follower plate 40, while end portions 24 remain radially stationary in position locking bead bundles 28, and are moved axially towards each other, so that respective connecting rods 29 rotate outwards from an initial position parallel to axis 3, to a final radial position with respect to axis 3. In other words, as a result of the above movements, each articulated rod 21 moves into its final expanded configuration, and the drum performs a torus-shaping operation, in which, drum 1, by means of connecting rods 29, forms two annular shoulders 55 just inwards of respective saddles 27, and carcass 2 assumes an expanded configuration, in which carcass 2 comprises a barrel-shaped central portion 56 bounded at each end by an inner annular flange 57 contacting relative annular shoulder 55 and connecting central portion 56 to relative annular lateral portion 54.

At this point (FIG. 4), compressed air is injected into each annular chamber defined by relative bladders 50, 51 and relative tubular appendix 47, so that portion 53 of bladder 51 gradually inflates, followed by gradual cone-shaped inflation of portion 52 of bladder 51, and relative annular lateral portion 54 is turned outwardly up about relative bead bundle 28 and onto relative annular flange 57, as described in detail in Patent Application WO 2008/122852, by gradually rolling portion 53 along relative annular shoulder 55, and substantially "rolling" relative annular lateral portion 54 onto relative annular flange 57.

If, as in the example shown, portion 53 of each bladder 51 is oversized with respect to relative annular shoulder 55, portions 53, on reaching the outer edges of relative annular flanges 57, flop over the edges axially towards each other, and also roll over respective axial-end portions of central portion 56. To form a carcass 2, as in the example shown, with particularly high turn-ups, and at any rate higher than annular shoulders 55, flop-over of bladders 51 provides for also rolling the ends of annular lateral portions 54 onto the outer surface of central portion 56.

By performing the above operations in reverse, by means of central screw 20 and pistons 45, articulated rods 21 are restored to the initial extended configuration, and the formed carcass 2 is unloaded axially off drum 1.

In connection with the above, it should be pointed out that:
- having an outer surface that remains rigid in any configuration, drum 1 provides for forming the body of carcass 2 extremely accurately;
- on drum 1, the torus-shaping operation is completely mechanical, with no compressed air being injected into carcass 2, which means the drum is simpler in design (no need for seals or seal supports), and the operation is carried out more accurately, with none of the drawbacks posed by subjecting a green carcass to internal pressure;
- in addition to forming carcasses 2 with extra-high turn-ups, forming annular shoulders 55 during the torus-shaping operation also prevents bead bundles 28 from being subjected, during the turn-up operation, to twisting moments, which are the major cause of internal failure and imperfections in the bead area of the finished tyres (not shown).

Figure 9:
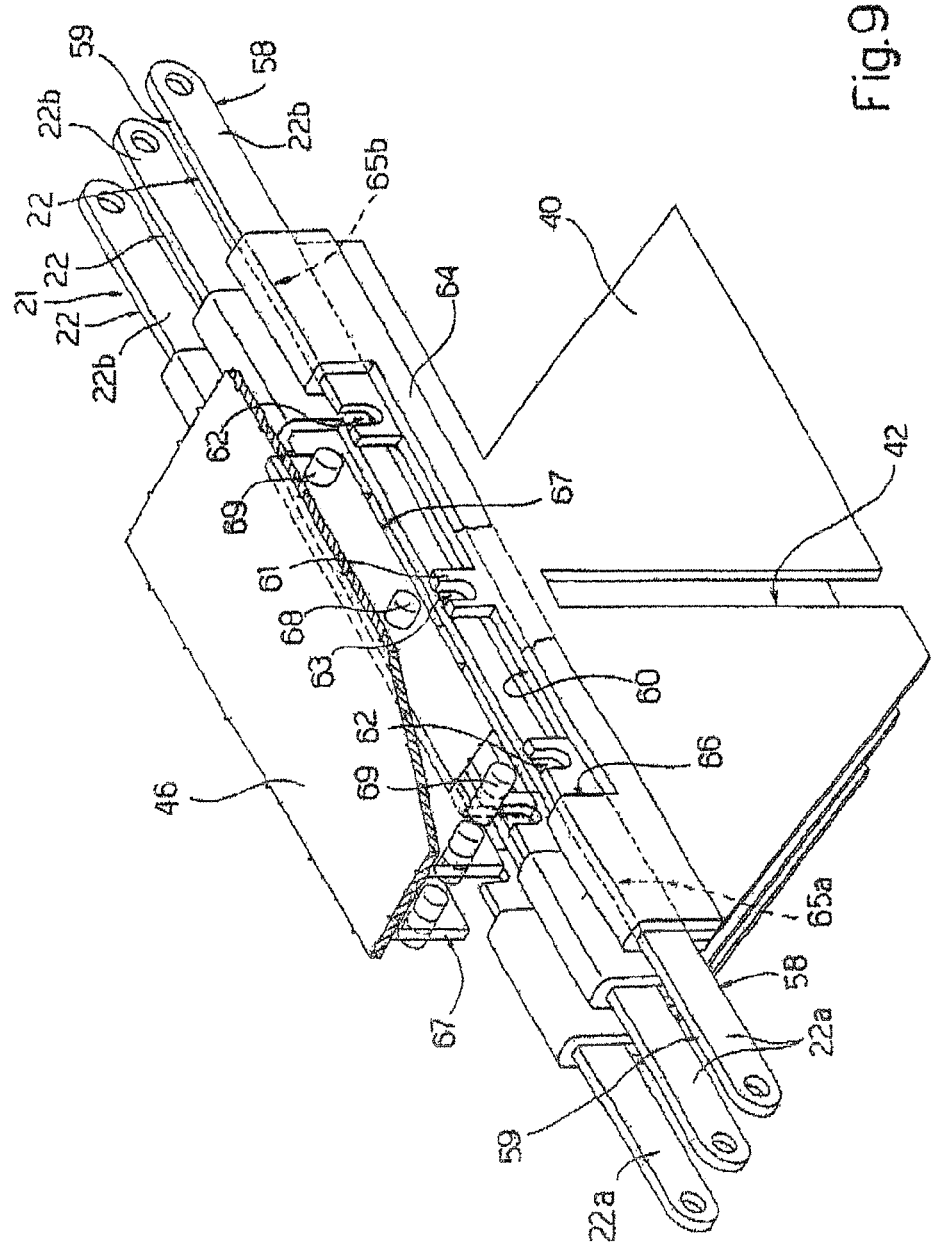
FIG. 9 shows an exploded view in perspective of a variation of a second detail in FIG. 1.

The FIG. 9 variation relates to a particular embodiment of central portions 22 of articulated rods 21, plates 40, and sleeve 46, enabling adjustment of the distance between the two bead carriers 25.

As shown in FIG. 9, central portion 22 of each articulated rod 21 is divided into two coaxial portions 22a and 22b, which are parallel to axis 3, are separated by relative plate 40, are bounded, on the side facing axis 3, by respective inner edges 58 aligned with each other and parallel to axis 3, and are bounded, on the outward side, by respective outer edges 59 parallel to respective inner edges 58. Plate 40 is bounded at the top by an edge 60 parallel to axis 3, and from a central portion of which projects radially outwards an appendix 61 substantially aligned with relative central slot 42 and of a height substantially equal to the distance between each inner edge 58 and relative outer edge 59. Each portion 22a, 22b has a recess 62 along its outer edge 59, close to the end facing the other portion 22b, 22a; and, similarly, appendix 61 has a central recess 63, similar to recesses 62, on its free end.

Plate 40 is fitted integrally, astride edge 60, with a sheath 64, which is U-shaped with its concavity facing axis 3, is partly engaged by a radially outer portion of plate 40, and defines internally, together with edge 60, a channel divided into a channel 65a and a channel 65b by a central window 66 exposing appendix 61. Channels 65a and 65b are aligned along edge 60 and engaged respectively in sliding manner by part of portion 22a and part of portion 22b of central portion 22 of relative articulated rod 21, with said parts of portions 22a and 22b positioned with their inner edges 58 contacting edge 60.

Central portion 22 of each articulated rod 21 also comprises a bridge-type connecting member 67, which is defined by a substantially rectangular plate of a width substantially equal to the height of appendix 61, and of a length chosen from a given number of lengths. The connecting member plate is fitted through with three pins equally spaced along, perpendicular to, and projecting from the plate. One of the three pins, indicated 68, is located halfway along connecting member 67, and transversely engages recess 63 to fix connecting member 67 longitudinally to relative plate 40; while the other two pins, indicated 69, are located on opposite sides of pin 68, at a distance from each other proportional to the length of relative connecting member 67, and transversely engage respective recesses 62 to fix portions 22a and 22b longitudinally to plate 40 and at a distance from each other proportional to the distance between pins 69.

Connecting members 67 are connected integrally, by curing, to the inner surface of sleeve 46, and are held in position, inside relative windows 66, by sleeve 46.

In other words, having a given number of sleeves 46, each with respective connecting members 67, and differing from each other as to the length of respective connecting members 67, it is possible, by selecting the appropriate sleeve 46, to establish a given distance between the two bead carriers 25 and so adapt the length of drum 1 to the size of the carcass 2 to be produced.

The invention claimed is:

1. A method of building tyre carcasses, the method comprising the steps of:
   providing a building drum having a longitudinal axis, and two bead carriers and an outer surface which are coaxial with the longitudinal axis; the two bead carriers and at least part of the outer surface being defined by a ring of longitudinal articulated rods lying in respective planes of a sheaf of planes through the longitudinal axis;
   forming, about the ring of articulated rods, a tubular carcass body positioned so that two annular lateral portions of the carcass body extend over respective turn-up means supported by the ring of articulated rods;
   fitting two bead bundles onto the tubular carcass body, each bead bundle being located about the ring of articulated rods, at a relative bead carrier and just axially inwards of a respective said annular lateral portion; and
   both locking the bead bundles to the tubular carcass body, by means of the two bead carriers, and torus-shaping the tubular carcass body by moving and/or deforming the articulated rods in their planes,
   wherein each articulated rod comprises a central first portion; two end second portions located at opposite ends of the first portion; and two intermediate third portions located at opposite ends of the first portion and hinging the second portions to the first portion; each bead bundle being fitted about a respective said portion, which defines a respective said bead carrier.

2. A method as claimed in claim 1, wherein the steps of forming the tubular carcass body and fitting on the bead bundles are performed after setting each articulated rod to a substantially straight, extended configuration, and after positioning all the articulated rods parallel to the longitudinal axis and at the same distance (R1) from the longitudinal axis.

3. A method as claimed in claim 1, wherein the bead bundles are locked to the tubular carcass body by expanding the ring of articulated rods radially.

4. A method as claimed in claim 3, wherein the ring of articulated rods is expanded radially with each articulated rod in substantially straight, extended configuration and parallel to the longitudinal axis; and by translating each articulated rod in its plane, to move the articulated rod from its distance (R1) to a second distance (R2), greater than the first, from the longitudinal axis.

5. A method as claimed in claim 1, wherein torus-shaping the tubular carcass body is performed by deforming each articulated rod in its plane from a first configuration, which is a substantially straight, extended configuration parallel to the longitudinal axis, to a substantially omega-shaped second configuration.

6. A method as claimed in claim 5, wherein each articulated rod is deformed in its plane from the first configuration to the second configuration by:
- translating said first portion away from the longitudinal axis; and, at the same time,
- moving the second portions axially towards each other, so as to move the third portions into substantially radial positions, in which the third portions define, along the drum and together with the third portions of the other articulated rods, two annular shoulders, each adjacent to and axially inwards of the relative bead carrier.

7. A method as claimed in claim 6, and also comprising the step of operating the turn-up means to turn the two annular lateral portions of the carcass body up about the respective bead bundles and against the respective annular shoulders.

* * * * *